United States Patent [19]

Mori et al.

[11] Patent Number: 4,708,481
[45] Date of Patent: Nov. 24, 1987

[54] METHOD OF AND APPARATUS FOR OPTICALLY MEASURING DISPLACEMENT

[75] Inventors: Sadao Mori; Toshio Akatsu, both of Ibaraki, Japan

[73] Assignee: Hitachi, Ltd., Tokyo, Japan

[21] Appl. No.: 844,682

[22] Filed: Mar. 27, 1986

[30] Foreign Application Priority Data

Mar. 27, 1985 [JP] Japan .................................. 60-60580

[51] Int. Cl.⁴ ............................................... G01B 9/02
[52] U.S. Cl. .................................. 356/358; 356/351; 356/363; 377/17
[58] Field of Search ....................... 356/351, 358, 363; 377/17

[56] References Cited

U.S. PATENT DOCUMENTS

| | | | |
|---|---|---|---|
| 3,661,464 | 5/1972 | Hubbard | 377/17 X |
| 4,225,240 | 9/1980 | Balasubramanian | 356/360 |
| 4,298,283 | 11/1981 | Makosch et al. | 356/349 X |
| 4,358,201 | 11/1982 | Makosch | 356/351 |
| 4,632,556 | 12/1986 | Akatsu | 356/351 |

Primary Examiner—Davis L. Willis
Assistant Examiner—Matthew W. Koren
Attorney, Agent, or Firm—Antonelli, Terry & Wands

[57] ABSTRACT

The magnitude of displacement of an object to-be-measured is measured by projecting light beams on the object to-be-measured and a reference plane and utilizing the interference of lights reflected therefrom. The reflected lights from the object to-be-measured and the reference plane have their phase difference changed cyclically and forcibly. The discontinuous change of the magnitude of phase shift at the moment at which the phase difference of the two reflected lights caused by the displacement of the object to-be-measured has been compensated, and the magnitude of displacement of the object to-be-measured is found from the counted result of the discontinuous changes and the magnitude of phase shift at the moment at which the phase difference has been compensated.

21 Claims, 32 Drawing Figures

METHOD OF AND APPARATUS FOR OPTICALLY MEASURING DISPLACEMENT

BACKGROUND OF THE INVENTION

1. Field of the Invention

The present invention relates to a method of and apparatus for optically measuring a displacement for use in the displacement measurement etc. of a machine which requires accurate positioning, for example, a semiconductor production plant or a coordinate measuring instrument.

2. Description of the Prior Art

A method of optically measuring the displacement of an object to-be-measured is, for example, an interferometric method disclosed in the specification of U.S. Pat. No. 4,298,283. This method is such that light is projected on a reference plane and a plane to-be-measured, that the phases of resulting reflected lights are cyclically and forcibly changed by a phase shifter, and that the magnitude of the displacement of the object to-be-measured is evaluated from the magnitude of phase shift at the moment at which the phase change generated by the displacement of the object has been compensated by the phase shifter.

This method, however, cannot be used for a positioning displacement sensor because the measurement range thereof is as narrow as approximately a half of the wavelength of a light source employed. Moreover, even when the use is restricted to the measurements of minute displacements, the limited measurement range makes it necessary to adjust the phases of reflected lights with a Babinet-Soleil compensator before the measurement and to start the measurement from the middle of the measurement range. This initialization requires a long time.

SUMMARY OF THE INVENTION

An object of the present invention is to provide a method of and apparatus for optically measuring a displacement which have a wide measurement range and which dispense with initialization.

When an object to-be-measured moves beyond a measurement range in a plus direction by way of example, a magnitude of phase shift at the moment of the compensation of the phase difference between reflected lights, in other words, a measurement value, which has been initialized to a middle position within the measurement range at first, increases therefrom gradually; and upon reaching its maximum value, it changes discontinuously from the maximum value to the minimum value and returns to the middle position again; this cycle being repeated. Now, letting λ denote the wavelength of a light source, one cycle of the above situation corresponds to a fixed magnitude of displacement (λ/2). Therefore, the measurement range can be widened by counting such discontinuous changes.

The present invention is characterized in that the phase difference between lights reflected from an object to-be-measured and a reference plane is forced to fluctuate by means of a phase shifter, that the discontinuous change of a magnitude of phase shift is counted at the moment at which a phase difference developed by the displacement of the object to-be-measured is compensated by the phase shifter, and that the displacement magnitude of the object to-be-measured is obtained from the counted result and the magnitude of phase shift at the moment of the compensation of the phase difference.

BRIEF DESCRIPTION OF THE DRAWINGS

FIGS. 2A and 2B thru FIGS. 10A and 10B are diagrams for explaining examples of the operation of a counter circuit in FIG. 1, in which FIGS. 2A and 2B are output waveform diagrams of a sample-and-hold circuit, FIGS. 10A and 10B are output waveform diagrams of an AND circuit 29;

DESCRIPTION OF THE PREFERRED EMBODIMENTS

Figure 1:
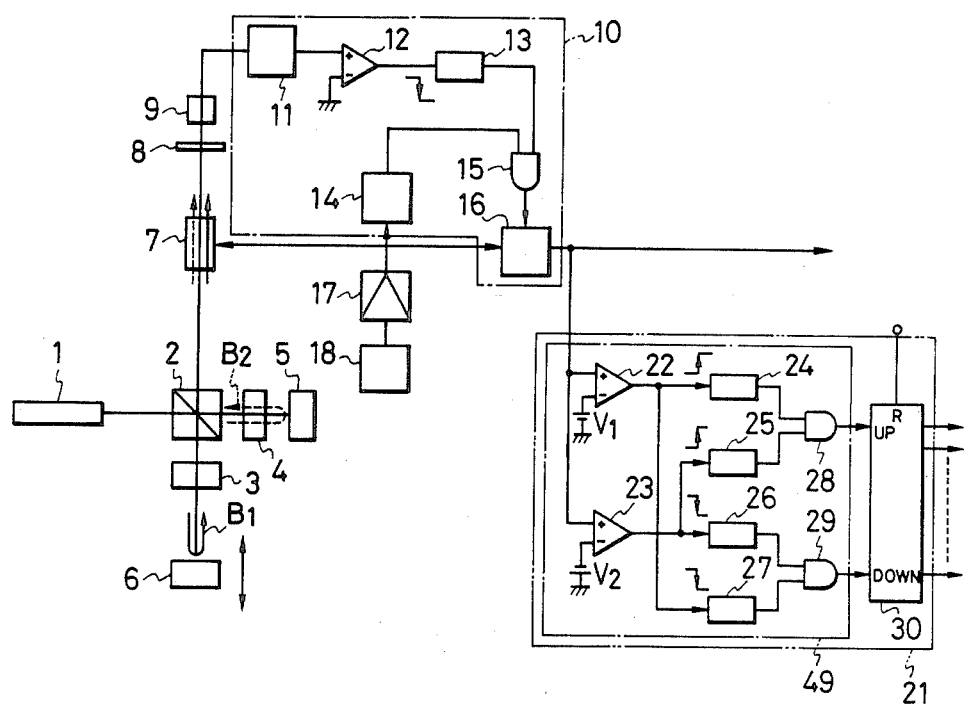
FIG. 1 is a block diagram of an embodiment of the present invention.

Now, an embodiment of the present invention will be described with reference to FIGS. 1-13. In FIG. 1, numeral 1 designates a light source emitting coherent linear polarization, for example, a laser oscillator, and the oscillation plane of the linear polarization is in a direction defining an angle of 45 degrees to the sheet of the drawing. A polarizing beam splitter 2 is arranged on the optical path of the light source 1, and it reflects light $B_1$ of a component having an oscillation plane perpendicular to the sheet of the drawing and transmits light $B_2$ of a component having an oscillation plane parallel thereto. A quarter-wave plate 3 and an object to-be-measured 6 are arranged on the optical path of the beam $B_1$ reflected by the polarizing beam splitter 2. On the other hand, a quarter-wave plate 4 and a reference plane 5 are arranged on the optical path of the beam $B_2$ transmitted through the polarizing beam splitter 2. When the aforementioned linear polarization is reciprocated once through the quarter-wave plate 3 or 4, the oscillation plane thereof is rotated 90 degrees. A phase shifter 7, a polarizer 8 and a photodetector 9 are arranged on the optical path of the beams $B_1$ and $B_2$ having passed through the polarizing beam splitter 2. The phase shifter 7 is, for example, an electrooptic crystal having the Pockels effect. By applying a voltage to this electrooptic crystal, the refractive index thereof for the beam having the oscillation plane perpendicular to the sheet of the drawing and that for the beam having the oscillation plane parallel thereto are changed to control the phase difference between the two beams. The polarizer 8 transmits only an oscillating component defining an angle of 45 degrees to the sheet of the drawing. The photodetector 9 converts into an electric signal the intensity of the transmitted light of the polarizer 8 changing in accordance with the phase difference of the beams $B_1$ and $B_2$, and applies the electric signal to a sampling circuit 10. This sampling circuit 10 consists of a differentiation circuit 11, a comparator 12, edge detection means, e.g., a monostable multivibrator 13, a gate circuit 14, an AND circuit 15, and a sample-and-hold circuit 16. Here, the monostable multivibrator 13 is triggered by the falling edge of the output pulse of the comparator 12. The phase shifter 7, gate circuit 14 and sample-and-hold circuit 16 are supplied with the output voltage of an oscillator 18 through an A.C. amplifier 17. Thus, the phase shifter 7 forces the phase difference of the beams $B_1$ and $B_2$ to fluctuate, and the gate circuit 14 switches its output to a high level or a low level. A counter circuit 21 is connected to the output side of the sampling circuit 10. This counter circuit 21 is constructed of an up/down pulse generator circuit 49 and an up/down counter 30. The up/down pulse generator circuit 49 consists of comparators 22 and 23, edge detection means, e.g., monostable multivibrators 24, 25, 26 and 27, and AND circuits 28 and 29. Here, the monostable multivibrators 24 and 25 are respectively triggered by the rising edges of the output pulses of the comparators 22 and 23, and their outputs are input to the AND circuit 28. In addition, the monostable multivibrators 26 and 27 are respectively triggered by the falling edges of the output pulses of the comparators 23 and 22, and their outputs are input to the AND circuit 29. The output of the AND circuit 28 is connected to the UP terminal of the up/down counter 30, and that of the AND circuit 29 to the DOWN terminal thereof.

Figure 2A:
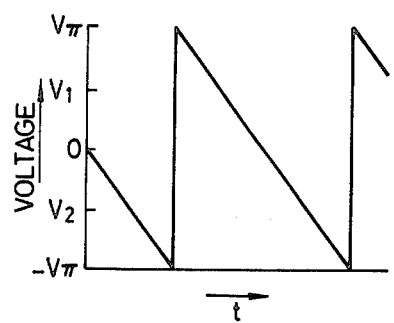
Figure 2B:
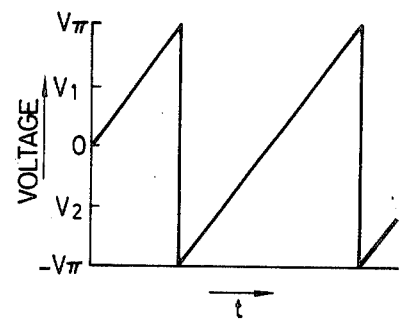
Figure 3A:
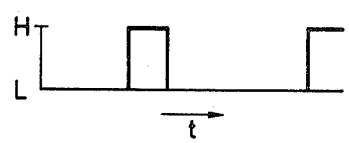
FIGS. 3A and 3B are output waveform diagrams of a comparator 22.
Figure 3B:
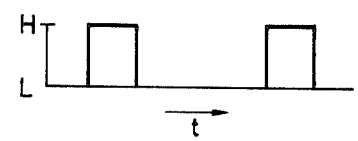
Figure 4A:
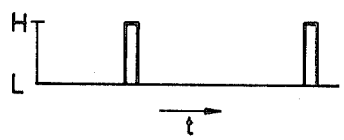
FIGS. 4A and 4B are output waveform diagrams of a monostable multivibrator 24.
Figure 4B:
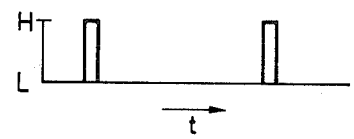
Figure 5A:
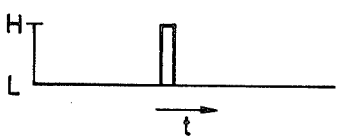
FIGS. 5A and 5B are output waveform diagrams of a monostable multivibrator 27.
Figure 5B:
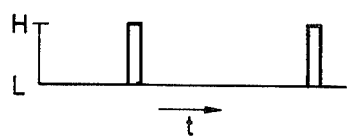
Figure 6A:
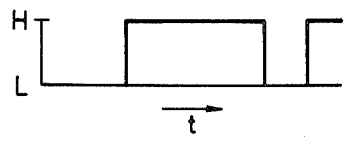
FIGS. 6A and 6B are output waveform diagrams of a comparator 23.
Figure 6B:
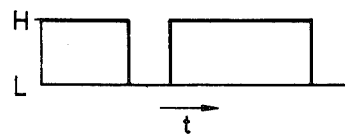
Figure 7A:
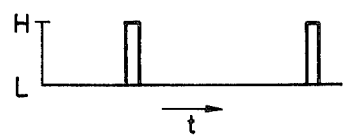
FIGS. 7A and 7B are output waveform diagrams of a monostable multivibrator 25.
Figure 7B:
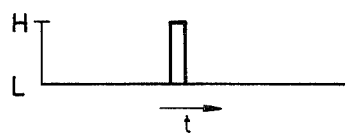
Figure 8A:
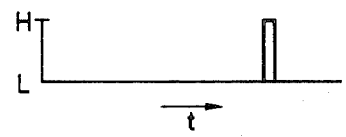
FIGS. 8A and 8B are output waveform diagrams of a monostable multivibrator 26.
Figure 8B:
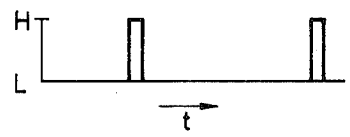
Figure 9A:
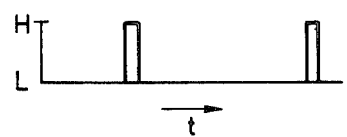
FIGS. 9A and 9B are output waveform diagrams of an AND circuit 28.
Figure 9B:
Figure 10A:
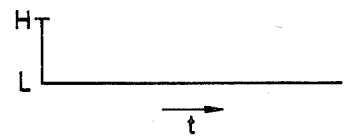
Figure 10B:

FIGS. 2A and 2B thru FIGS. 10A and 10B are diagrams for explaining the operation of the counter circuit 21, and a case of displacing the object to-be-measured 6 at a fixed speed is taken as an example. FIGS. 2A and 2B show the outputs of the sample-and-hold circuit 16, FIGS. 3A and 3B show the outputs of the comparator 22, FIGS. 4A and 4B show the outputs of the monostable multivibrator 24, FIGS. 5A and 5B show the outputs of the monostable multivibrator 27, FIGS. 6A and 6B show the outputs of the comparator 23, FIGS. 7A and 7B show the outputs of the monostable multivibrator 25, FIGS. 8A and 8B show the outputs of the monostable multivibrator 26, FIGS. 9A and 9B show the outputs of the AND circuit 28, and FIGS. 10A and 10B show the outputs of the AND circuit 29. FIGS. 2A, 3A, ... and 10A correspond to a case where the object to-be-measured 6 is displaced in a plus direction (in a direction in which the magnitude of the displacement increases) from the position of an origin (the position at which the object to-be-measured 6 starts the displacement), while FIGS. 2B, 3B, ... and 10B correspond to a case where the object to-be-measured 6 is displaced in a minus direction (a direction in which the displacement magnitude decreases). Besides, the reference voltage $V_1$ of the comparator 22 is set between 0 (zero) and $V_\pi$, while the reference voltage $V_2$ of the comparator 23 is set between $-V_\pi$ and 0, and the pulse widths of the output pulses of the monostable multivibrators 24, 25, 26 and 27 are made sufficiently small beforehand (refer to FIGS. 3A and 3B thru FIGS. 8A and 8B).

In the case of displacing the object to-be-measured 6 in the plus direction under these conditions, when the output of the sample-and-hold circuit 16 (refer to FIG. 2A) changes discontinuously from $-V_\pi$ to $V_\pi$, the pulses generated by the monostable multivibrators 24 and 25 (refer to FIGS. 4A and 7A) overlap in time, and hence, the AND circuit 28 outputs the up pulse (refer to FIG. 9A). In the case of displacing the object to-be-measured 6 in the minus direction, when the output of the sample-and-hold circuit 16 (refer to FIG. 2B) changes discontinuously from $V_\pi$ to $-V_\pi$, the pulses generated by the monostable multivibrators 26 and 27 (refer to FIGS. 8B and 5B) overlap, and the AND circuit 29 outputs the down pulse (refer to FIG. 10B).

Although the above description concerns the case where the displacement speed is constant, the same applies to a case where the displacement speed changes.

Next, the operation of the embodiment of the present invention will be described. In the linear polarization emitted from the light source 1, the light of the component having the oscillation plane perpendicular to the sheet of the drawing is denoted by $B_1$, and the light of the component having the oscillation plane parallel thereto is denoted by $B_2$. Then, the beam $B_1$ is reflected by the polarizing beam splitter 2, transmitted through the quarter-wave plate 3 and reflected by the object to-be-measured 6, and it arrives at the polarizing beam splitter 2 via the quarter-wave plate 3 again. Since the beam $B_1$ has reciprocated through the quarter-wave plate 3, the oscillation plane thereof at this time is parallel to the sheet of the drawing owing to the rotation of 90 degrees, and this beam is transmitted through the polarizing beam splitter 2. On the other hand, the beam $B_2$ is transmitted through the polarizing beam splitter 2 and enters this polarizing beam splitter 2 via the path of the quarter-wave plate→the reference plane 5→the quarter-wave plate 4. Since the oscillation plane of the beam $B_2$ is perpendicular to the sheet of the drawing owing to the rotation of 90 degrees, this beam is reflected by the polarizing beam splitter 2. The beams $B_1$ and $B_2$ emergent from the polarizing beam splitter 2 reach the polarizer 8 via the phase shifter 7. Here, in the beams $B_1$ and $B_2$, only the light components having the oscillation planes of 45° to the sheet of the drawing pass through the polarizer 8, and they give rise to interference, so that the intensity of the transmitted light through the polarizer 8 changes in accordance with the phase difference between the beams $B_1$ and $B_2$. This intensity is converted into the electric signal by the photodetector 9, and the electric signal is input to the sampling circuit 10. Meanwhile, the output voltage of the oscillator 18 is amplified by the A.C. amplifier 17 and then applied to the phase shifter 7, whereby the phase difference of the beams $B_1$ and $B_2$ is forced to fluctuate by $\phi f$ in the following equation (1):

$$\phi f = A \sin wt \qquad (1)$$

Here, an amplitude A is set somewhat larger than $\pi$. In addition, a phase difference $\phi$ which is based on the difference between an optical path length $l$ from the object to-be-measured 6 to the center of the polarizing beam splitter 2 and an optical path length $l_o$ from the reference plane 5 to the center of the polarizing beam splitter 2 is given by Eq. (2):

$$\phi = \frac{4\pi}{\lambda}(l - l_o) \quad (2)$$

Accordingly, the phase difference $\phi_t$ of the beams $B_1$ and $B_2$ becomes as indicated by Eq. (3):

$$\phi_t = \phi + \phi f$$
$$= \frac{4\pi}{\lambda}(l - l_o) + A \sin wt \quad (3)$$

Letting $I_1$ and $I_2$ denote the intensities of the respective beams $B_1$ and $B_2$ exhibited when they have passed through the polarizer 8, the intensity I of the interference light is expressed by Eq. (4):

$$I = I_1 + I_2 + 2\sqrt{I_1 I_2} \cos \phi_t \quad (4)$$

This intensity of the interference light is converted by the photodetector 9 into the electric signal, which is passed through the differentiation circuit 11 and the comparator 12, whereupon the monostable multivibrator 13 generates a pulse at a time at which the interference signal indicated by Eq. (4) becomes the maximum. The phase difference $\phi_t$ of the beams $B_1$ and $B_2$ at this time is given by Eq. (5):

$$\phi_t = 2n\pi (n=0, \pm 1, \pm 2, \ldots) \quad (5)$$

While $\phi f$ indicated by Eq. (1) is caused to fluctuate in the range of $-A \leq \phi f \leq A$, only the pulse generated for $-\pi \leq \phi f \leq \pi$ is selected by the gate circuit 14 as well as the AND circuit 15, and the input voltage of the phase shifter 7 at that time t is sampled by the sample-and-hold circuit 16 so as to find the magnitude of phase shift $\phi f$ at that time.

With this measure, valid pulses are generated when $\phi f$ assumes a value satisfying Eq. (6) indicated below, save when the phase difference $\phi$ expressed by Eq. (2) and arising in correspondence with the displacement of the object to-be-measured 6 becomes $(2m+1)\pi$ (m: integer):

$$\phi' + \phi f = 0 \quad (6)$$

Here, $\phi'$ is defined by Eq. (7):

$$\left. \begin{array}{c} \phi = 2m\pi + \phi' \\ |\phi'| < \pi \end{array} \right\} \quad (7)$$

where m denotes an integer.

In addition, when $\phi$ becomes $(2m+1)\pi$, pulses generated at times satisfying Eq. (8) becomes valid:

$$\phi f = \pm \pi \quad (8)$$

Figure 11:
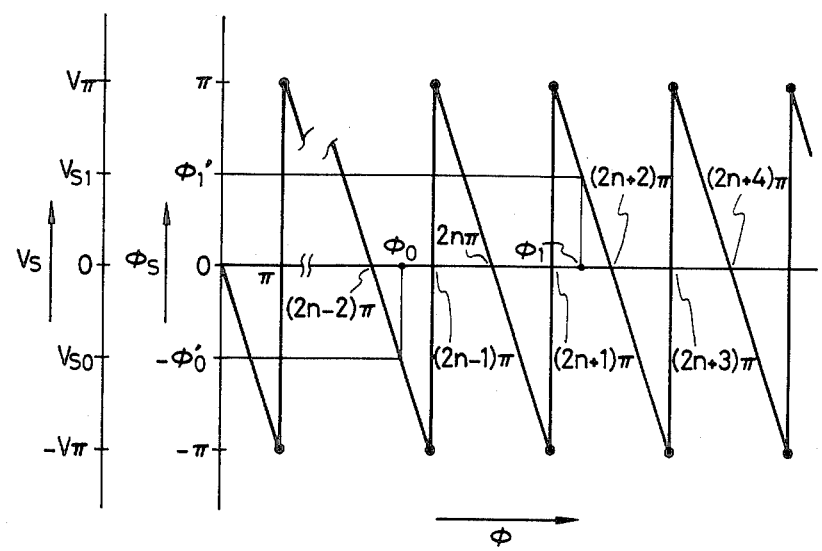
FIG. 11 is a diagram showing the relationships between the phase difference and the magnitude of phase shift and between the phase difference and the applied voltage of a phase shifter in the embodiment illustrated in FIG. 1.

Accordingly, FIG. 11 is obtained in which the phase difference $\phi$ is taken on the axis of abscissas and the magnitude of phase shift $\phi f$ and the applied voltage $V_s$ of the phase shifter 7 at the generation of the valid pulse are taken on the axes of ordinates.

$\phi_0$ is let denote the phase difference of the beams $B_1$ and $B_2$ respectively reflected by the object to-be-measured 6 and the reference plane 5 when the object to-be-measured 6 lies at the position of the origin at first, and $\phi_0'$ is let denote a remainder obtained by subtracting integral times of $2\pi$ from $\phi_0$. Besides, $V_{s0}$ is let denote the output voltage of the sample-and-hold circuit 16 produced when the object to-be-measured 6 lies at the position of the origin. In terms of the magnitude of phase shift, $V_{s0}$ is multiplied by $\pi/V_\pi$ to become $-\phi_0'$. It is assumed that the object to-be-measured 6 be displaced in the plus direction from the position of the origin, to increase the phase difference $\phi$ from $\phi_0$ to $\phi_1$. $V_s$ decreases with increase in $\phi$, but when $\phi$ has exceeded $(2n-1)\pi$, $V_s$ changes from $-V_\pi$ to $V_\pi$ discontinuously at that time. Here, $V_\pi$ indicates a voltage required for giving rise to a phase difference $\pi$ between the reflected beams $B_1$ and $B_2$. Upon a further displacement, $V_s$ decreases gradually, and it changes from $-V_\pi$ to $V_\pi$ again when $\phi$ has exceeded $(2n+1)\pi$. $V_{s1}$ is let denote the output voltage of the sample-and-hold circuit 16 produced when $\phi$ has increased to $\phi_1$. In terms of the magnitude of phase shift, $V_{s1}$ is multiplied by $\pi/V_\pi$ to become $-\phi_1'$. Here, $\phi_1'$ indicates a remainder obtained by subtracting integral times of $2\pi$ from $\phi_1$. Accordingly, the magnitude of displacement at this time can be found in a way described below.

The discontinuous change of the output voltage of the sample-and-hold circuit 16 from $-V_\pi$ to $V_\pi$ is counted in $+$ by the counter circuit 21. The counted result is multiplied by $\lambda/2$, and the product has $$\frac{\lambda}{4 V_\pi} \times (-V_{s1} + V_{s0}) = \frac{\lambda}{4\pi} (\phi_1' - \phi_0')$$

added thereto.

In a case where the object to-be-measured 6 is displaced in the minus direction, the output voltage of the sample-and-hold circuit 16 changes from $V_\pi$ to $-V_{90}$ discontinuously when the phase difference $\phi$ exceeds odd-number times of $\pi$, i.e., $(2n+1)\pi$, $(2n+3)\pi$, ... etc. in the decreasing process thereof. Therefore, the discontinuous changes are counted in minus by the counter circuit 21, and the others are as in the above case of finding the displacement in the plus direction, whereby the displacement can be found.

Figure 12:
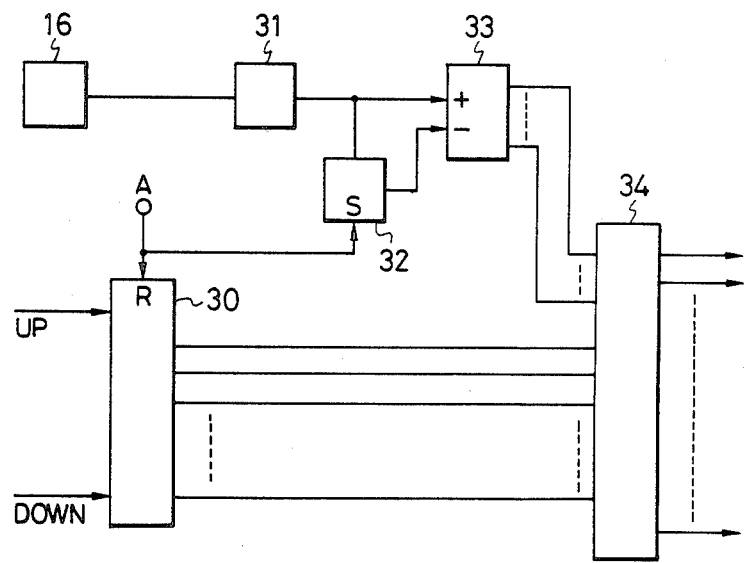
FIG. 12 is a diagram showing an example of an output circuit which is connected to an up/down counter in FIG. 1.

FIG. 12 shows an example of an output circuit for executing the calculation processing described above. An A/D converter 31 converts the output voltage of the sample-and-hold circuit 16 into a digital value expressive of the fraction $\phi'$ of the phase difference, and applies the digital value to a subtraction circuit 33 to be described below. An origin position memory circuit 32 stores the fraction $\phi_0'$ of the phase difference exhibited when the object to-be-measured 6 lies at the position of the origin, and applies it to the subtraction circuit 33. This subtraction circuit 33 subtracts the content of the origin position memory circuit 32 from the phase difference $\phi_1'$ at the final position. An adder 34 adds the content of the subtraction circuit 33 as multiplied by $\lambda/4\pi$ and the content of the counter circuit 30 as multiplied by $\lambda/2$. When a reset signal is applied to a terminal A, the content of the counter 30 is cleared, and simultaneously, the fraction $\phi_0'$ of the phase difference at the position of the origin is stored in the origin position memory circuit 32.

Figure 13:
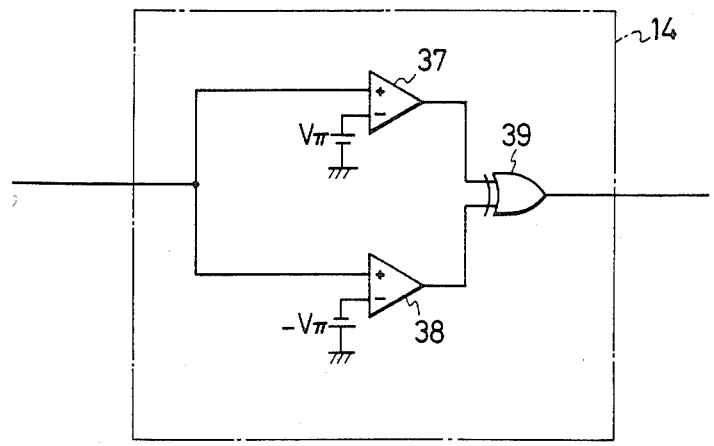
FIG. 13 is a diagram showing an example of a gate circuit in FIG. 1.

FIG. 13 shows an example of the gate circuit 14 shown in FIG. 1. The gate circuit 14 consists of comparators 37 and 38 and an OR circuit 39. The reference voltage of the comparator 37 is set at $V_\pi$, and that of the comparator 38 at $-V_\pi$. The outputs of the comparators 27 and 38 are input to the OR circuit 39. According to this circuit, the output becomes 'high' only when the input voltage lies in the range of $V_\pi - -V_\pi$. When the AND between this high output and the output of the monostable multivibrator 13 is taken by the AND circuit 15, only pulses generated at this time can be selected.

Figure 14:
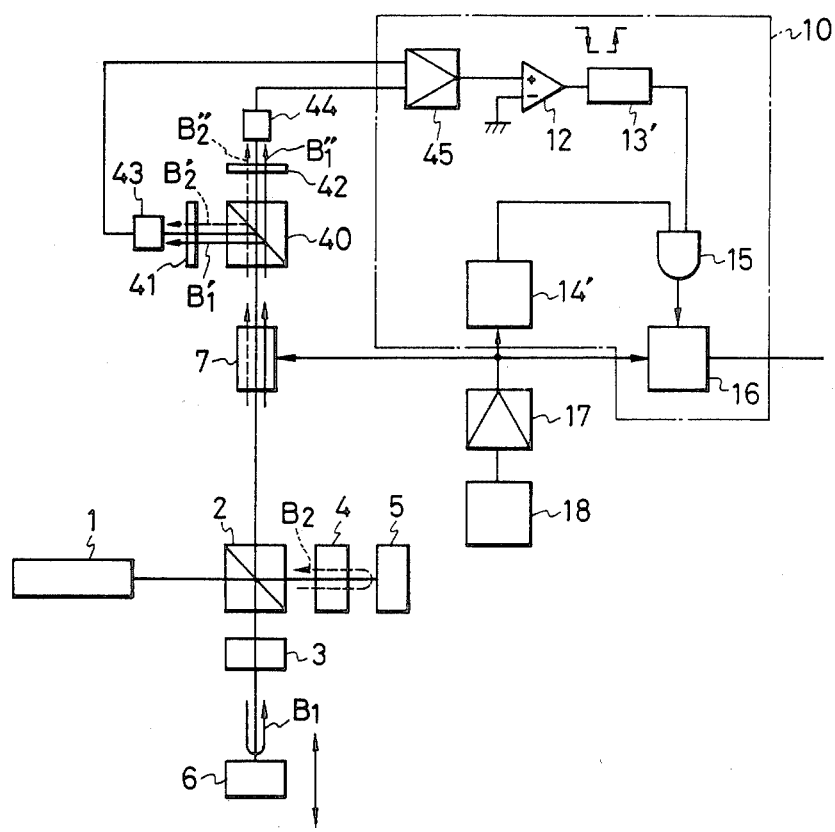
FIG. 14 is a block diagram of another embodiment of the present invention.

FIG. 14 is a block diagram showing another embodiment of the present invention, with a counter circuit omitted therefrom. In FIG. 14, components assigned the same numerals as in FIG. 1 are identical portions. A polarizing beam splitter 40 is arranged on the optical path of the beams having passed through the phase shifter 7. Polarizers 41 and 42 are respectively arranged on the reflected beam path and transmitted beam path of the polarizing beam splitter 40. The transmitting axis of the polarizer 41 defines an angle of 45° to the sheet of the drawing, while that of the polarizer 42 defines an angle of −45°. Numerals 43 and 44 indicate photodetectors, and numeral 45 indicates a differential amplifier. A monostable multivibrator 13′ is triggered by both the rising edge and falling edge of the output pulse of the comparator 12. A gate circuit 14′ provides a 'high' output when the applied voltage of the phase shifter 7 lies in a range of $-V(\pi/2)$ to $V(\pi/2)$. Here, $V(\pi/2)$ denotes a voltage which is required for causing the phase shifter 7 to generate a phase difference of $\pi/2$.

Next, the operation of this embodiment will be described. The beam $B_1$ (having the oscillation plane parallel to the sheet of the drawing) reflected from the object to-be-measured 6 and the beam $B_2$ (having the oscillation plane perpendicular to the sheet of the drawing) reflected from the reference plane 5 via the same paths as in the embodiment of FIG. 1 reach the polarizing beam splitter 40 via the phase shifter 7, and are split into reflected beams and transmitted beams here. The reflected beams are denoted by $B_1'$ and $B_2'$, and the transmitted beams by $B_1''$ and $B_2''$. The reflected beams $B_1'$ and $B_2'$ are transmitted through the polarizer 41 to give rise to interference. The intensity of this interference light is indicated by $I_1$. In addition, the transmitted beams $B_1''$ and $B_2''$ are transmitted through the polarizer 42 to give rise to interference.

Figure 15:
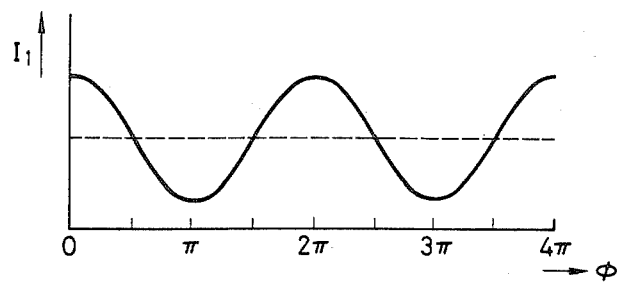
FIGS. 15 and 16 are diagrams showing the relationships between the phase difference and the intensity of interference light in FIG. 14.
Figure 16:
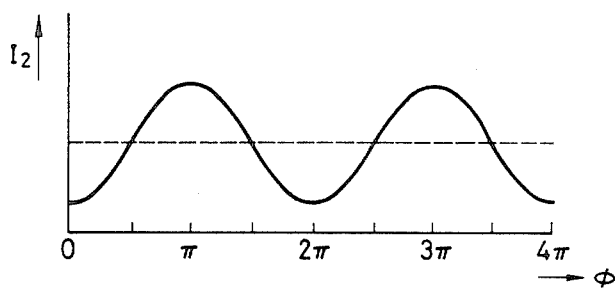
Figure 17:
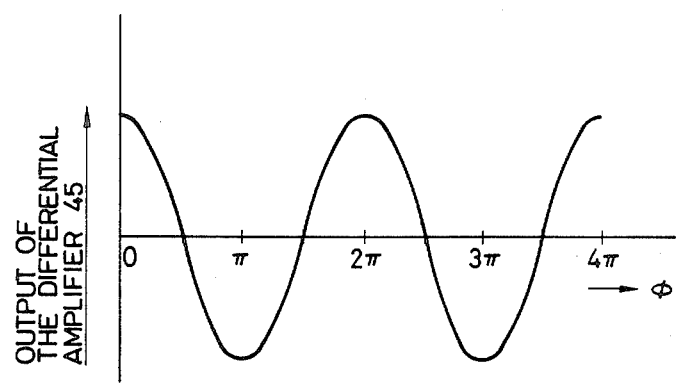
FIG. 17 is a diagram showing the relationship between the phase difference and the output of a differential amplifier in FIG. 14.

The intensity of this interference light is indicated by $I_2$. Here, the transmitting axes of the polarizers 41 and 42 have different directions. Therefore, though the mean values of the intensities $I_1$ and $I_2$ are equal, the phases of intensity change verses the phase difference of the reflected beams shift by 180°. FIG. 15 and FIG. 16 show this situation, and the phase difference $\phi$ is taken on the axes of abscissas, while the intensities $I_1$ and $I_2$ of the lights are respectively taken on the axes of ordinates. Accordingly, when the interference light intensities are converted into electric signals by the photodetectors 43 and 44 and the difference of the signals is taken by the differential amplifier 45, the output $e_s$ of the amplifier changes as shown in FIG. 17. Accordingly, when $\phi_t$ of Eq. (3) mentioned before meets Eq. (9), the output of the differential amplifier 45 becomes null.

$$\phi_t = \phi + \phi_f = n\pi + (\pi/2) \quad (9)$$

Here, n is an integer.

That is, the following equation (10) holds on the basis of Eq. (3) and Eq. (9):

$$\frac{4\pi}{\lambda}(l - l_o) + A \sin wt = n\pi + \frac{\pi}{2} \quad (10)$$

Figure 18:
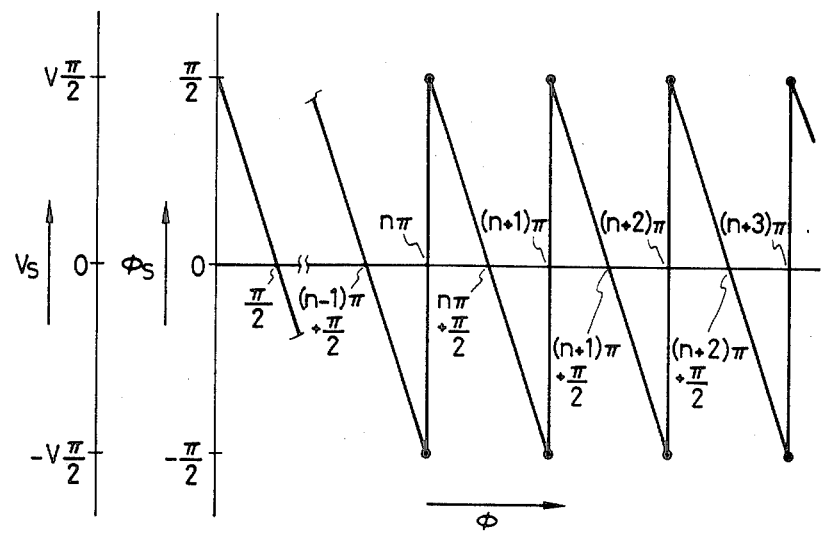
FIG. 18 is a diagram showing the relationships between the phase difference and the magnitude of phase shift and between the phase difference and the applied voltage of a phase shifter in FIG. 14.

Here, the amplitude A of the phase $\phi_f$ which is caused to fluctuate by the phase shifter 7 is set to at least $\pi/2$. On this occasion, $\phi_f$ fluctuates within a range of $-A \leq \phi_f \leq A$. When Eq. (9) is met, the output of the differential amplifier 45 crosses zero, so that the output of the comparator 12 changes from 'high' to 'low' or from 'low' to 'high' to trigger the monostable multivibrator 13′ and to generate a pulse. Only such pulses generated when the phase shift magnitude $\phi_f$ of the phase shifter 7 lies in a range of $-\pi/2$ to $\pi/2$ are selected by the gate circuit 14′ as well as the AND circuit 15, applied voltages to the phase shifter 17 at those times are sampled by the sample-and-hold circuit 16, and the magnitudes of phase shifts $\phi_s$ in those cases are found. Herein, the relationship between the phase difference $\phi$ of the reflected beams $B_1$ and $B_2$ and the output voltages of the sample-and-hold circuit 16, namely, the applied voltages $V_s$ to the phase shifter 7 become as shown in FIG. 18. Accordingly, the magnitude of displacement can be found in a way as stated below.

Each time the object to-be-measured 6 is displaced $\lambda/4$, the generated discontinuous change of the output voltage of the sample-and-hold circuit 16 is counted by the counter circuit (not shown). The counted result is multiplied by $\lambda/4$, and the product has $$\frac{\lambda}{8V\frac{\pi}{2}}(-V_{s1} + V_{s0})$$

added thereto. Here, $V_{s0}$ and $V_{s1}$ denote the output voltages of the sample-and-hold circuit 16 respectively provided when the object to-be-measured 6 lies at the origin position and the final position.

Figure 19:
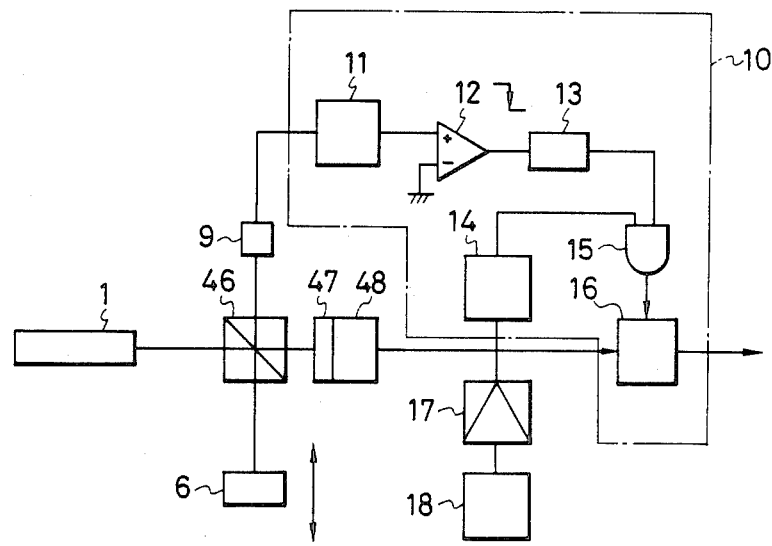
FIGS. 19 and 20 are block diagrams of still further embodiments of the present invention.

FIG. 19 is a block diagram showing still another embodiment of the present invention, in which the phases of reflected beams are caused to fluctuate by the use of an actuator such as electrostricitve element. Also in FIG. 19, a counter circuit is omitted from illustration. In FIG. 19, the same numerals as in FIG. 1 denote identical portions. A polarizing beam splitter 46 is arranged on the optical path of the polarization from the light source 1, and a mirror 47 is arranged on the optical path of transmitted light through the polarizing beam splitter 46. The front surface of the mirror 47 serves as a reference plane. The mirror 47 is attached to an electrostrictive element 48.

The light emitted from the laser oscillator 1 reaches the polarizing beam splitter 46, to be split into the reflected beam $B_1$ and the transmitted beam $B_2$. The reflected beam $B_1$ is reflected from the object to-be-measured 6, and reaches the photodetector 9 via the polarizing beam splitter 46. The transmitted beam $B_2$ is reflected from the front surface of the mirror 47 and reaches the polarizing beam splitter 46, in which it is reflected to cause interference with the reflected beam $B_1$. The intensity change of the interference light is converted into an electric signal by the photodetector 9. Meanwhile, the electrostrictive element 48 has the output voltage of the A.C. amplifier 17 applied thereto so as to be vibrated with a constant amplitude at all times. Thus, the phase shifter for causing the phases of the beams $B_1$ and $B_2$ to fluctuate can be constructed by vibrating the mirror 47 mounted on the electrostrictive element 48 in a direction perpendicular to the optic axis thereof. The operations of the other portions are the same as in the first embodiment.

Figure 20:
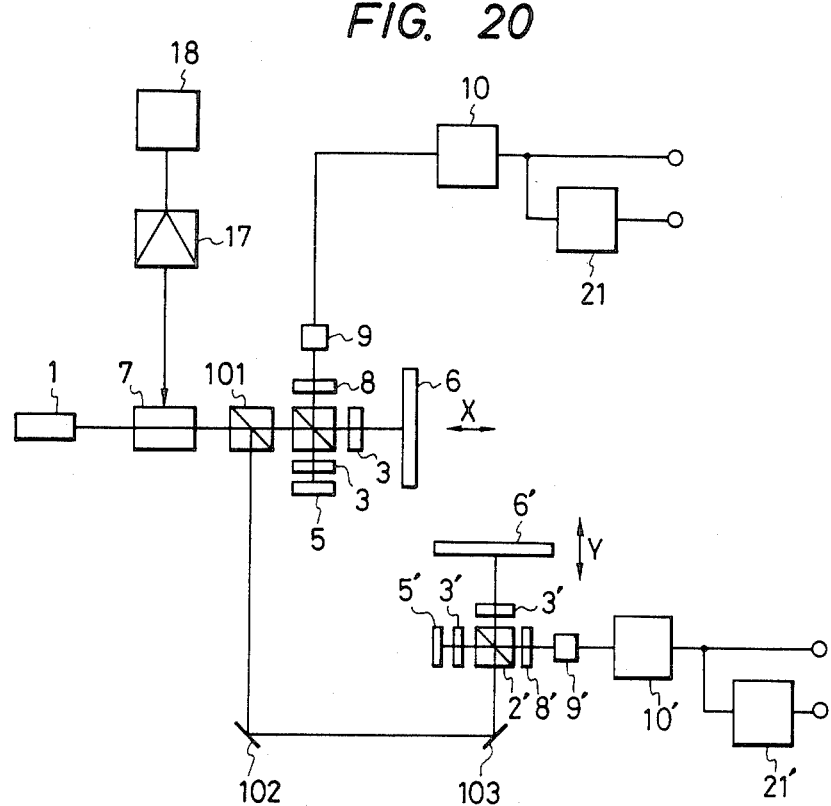

Also FIG. 20 shows still another embodiment of the present invention, which consists in a method of measuring displacements in a plurality of directions by the use of a single phase shifter of the electrooptic crystal type. FIG. 20 exemplifies a case of measuring displacements in two directions X and Y. In FIG. 20, the same numerals as in FIG. 1 denote identical portions. Besides, dashed numerals denote the same portions as indicated by the same numerals without dashes.

The light source 1 for emitting coherent linear polarization gives forth the linear polarization which has a polarization plane in a direction of 45° with respect to the sheet of the drawing, and which enters the electrooptic crystal 7. The electrooptic crystal 7 has a voltage applied thereto forcibly and cyclically beforehand, to give phase changes to respective lights having polarization planes vertical and horizontal to the sheet of the drawing. Light emergent from the electrooptic crystal 7 is split into two, a transmitted beam and a reflected beam by a polarizing beam splitter 101. Using the transmitted beam, the displacement of the object to-be-measured 6 in the X direction is measured. In addition, the reflected beam is changed by mirrors 102 and 103 into a beam rectilinearly propagating in the Y direction, with which the displacement of the object to-be-measured 6' in the Y direction is measured. The way of the measurement is the same as in the method illustrated in FIG. 1.

According to the present measurement method, the displacements in the plurality of directions can be measured with the single phase shifter. Further, when the laser oscillator is employed as the light source 1, the laser beam spreads comparatively little owing to an excellent directivity. Nevertheless, in a case where a distance from the light source 1 to the phase shifter such as electrooptic crystal 7 has become long in the method illustrated in FIG. 1, the diameter of the beam reaching the phase shifter 7 enlarges, and the entrance plane of the phase shifter 7 needs to be large in area. As a result, the magnitude of phasic change relative to the applied voltage decreases to the disadvantage. According to the present measuring method, this problem can also be solved.

Figure 21:
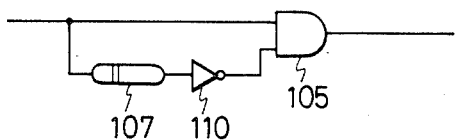
FIGS. 21 thru 23 are circuit diagrams of edge detection means.
Figure 22:
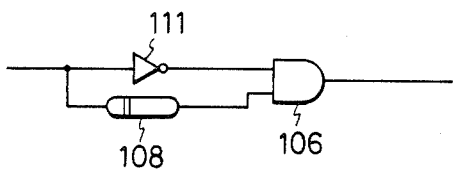
Figure 23:
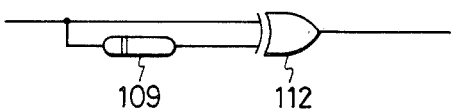

FIGS. 21 thru 23 show circuit arrangement diagrams of further edge detection means. FIG. 21 shows the edge detection means to detect a rising edge, which consists of a delay element 107, an inverter 110, and an AND circuit 105 for taking the AND between an input signal and a signal produced via the delay element 107 and the inverter 110. In addition, FIG. 22 shows the edge detection means to detect a falling edge, which consists of a delay element 108, an inverter 111, and an AND circuit for taking the AND between a signal from the delay element 108 and a signal from the inverter 111. Besides, FIG. 23 shows the edge detection means to detect rising and falling edges, which consists of a delay element 109, and an exclusive OR circuit 112 for taking the exclusive OR between an input signal and a signal from the delay element 109.

Even when such edge detection means are employed, operations and effects similar to those of the monostable multivibrators as the edge detection means in the respective embodiments can be attained.

As described above, according to the present invention, displacements in a wide range can be measured irrespective of the wavelength of a light source used.

What is claimed is:

1. In a method wherein light beams are projected on a reference plane and an object to-be-measured, and a displacement of the object to-be-measured is measured by utilizing interference of reflected lights from the reference plane and the object to-be-measured; a method of optically measuring a displacement comprising the step of cyclically and forcibly changing a phase difference of the reflected lights with an amplitude of at least $\pi$ rad by means of a phase shifter, the step of detecting a magnitude of phase shift at a moment by means of a sampling circuit and from a magnitude of a drive signal applied to said phase shifter at the moment at which phasic changes of the reflected lights based on the displacement of the object to-be-measured are compensated to a phase difference of fixed value by said phase shifter, the step of storing a magnitude of phase shift for compensating a phase difference of the reflected lights exhibited when the object to-be-measured lies at a position of an origin, by means of an origin position storing circuit, the step of counting a discontinuous change of the magnitude of phase shift arising each time the phase difference of the reflected lights exceeds a fixed value, by means of a counter circuit, and the step of optically finding a displacement magnitude of the object to-be-measured from the content of said origin position storing circuit, a content of said counter circuit, and an output of said sampling circuit expressive of a magnitude of phase shift for compensating a phase difference of the reflected lights exhibited when the object to-be-measured lies at a final position.

2. A method of optically measuring a displacement as defined in claim 1, wherein the magnitude of phase shift at the moment is detected from the magnitude of the drive signal applied to said phase shifter at the moment at which the phasic changes of the respective reflected lights from the reference plane and the object to-be-measured are compensated to the phase difference of $n\pi + \frac{1}{2}\pi$ by said phase shifter.

3. A method of optically measuring a displacement as defined in claim 1, wherein the magnitude of phase shift at the moment is detected from the magnitude of the drive signal applied to said phase shifter at the moment at which the phasic changes of the respective reflected lights from the reference plane and the object to-be-measured are compensated to the phase difference of $2n\pi$ by said phase shifter.

4. In a method wherein light beams are projected on a reference plane and an object to-be-measured, and a displacement of the object to-be-measured is measured by utilizing interference of reflected lights from the reference plane and the object to-be-measured; a method of optically measuring a displacement comprising the step of cyclically and forcibly changing the reference plane with a fixed amplitude by means of an actuator, the step of detecting a magnitude of phase fluctuation at a moment by means of a sampling circuit and from a magnitude of a drive signal applied to said actuator at the moment at which changes of the reflected lights based on the displacement of the object to-be-measured are compensated by the reference plane, the step of storing a magnitude of fluctuation for compensating a phase difference of the reflected lights exhibited when the object to-be-measured lies at a position of an origin, by means of an origin position storing circuit, the step of counting a discontinuous change of the magnitude of fluctuation arising each time the phase difference of the reflected lights exceeds a fixed value, by means of a counter circuit, and the step of optically finding a displacement magnitude of the object to-be-measured from the content of said origin position storing circuit, a content of said counter circuit, and an output of said sampling circuit expressive of a magnitude of fluctuation for compensating a phase difference of the reflected lights exhibited when the object to-be-measured lies at a final position.

5. In a method wherein light beams are projected on a reference plane and an object to-be-measured, and a displacement of the object to-be-measured is measured by utilizing interference of reflected lights from the reference plane and the object to-be-measured; a method of optically measuring a displacement comprising the first step of splitting light from a light source into a plurality of optical paths via a phase shifter, the reference plane and the object to-be-measured being arranged in each of the optical paths, the second step of cyclically and forcibly changing phase differences of the reflected lights with an amplitude of at least $\pi$ rad by means of said phase shifter, the third step of detecting a magnitude of phase shift at a moment by means of a sampling circuit and from a magnitude of a drive signal applied to said phase shifter at the moment at which phasic changes of the reflected lights based on the displacement of the object to-be-measured are compensated to a fixed value by said phase shifter, the fourth step of storing a magnitude of phase shift for compensating a phase difference of the reflected lights exhibited when the object to-be-measured lies at a position of an origin, by means of an origin position storing circuit, the fifth step of counting a discontinuous change of the magnitude of phase shift arising each time the phase difference of the reflected lights exceeds a fixed value, by means of a counter circuit, and the sixth step of optically finding a displacement magnitude of the object to-be-measured from the content of said origin position storing circuit, a content of said counter circuit, and an output of said sampling circuit expressive of a magnitude of phase shift for compensating a phase difference of the reflected lights exhibited when the object to-be-measured lies at a final position, said third to sixth steps being performed in each of said plurality of optical paths.

6. In an apparatus wherein light beams are projected on a reference plane and an object to-be-measured, and a displacement of the object to-be-measured is measured by utilizing interference of reflected lights from the reference plane and the object to-be-measured; an apparatus for optically measuring a displacement comprising a phase shifter which cyclically and forcibly changes a phase difference of the reflected lights with an amplitude of at least $\pi$ rad, a sampling circuit which samples a magnitude of a drive signal applied to said phase shifter at the moment that phasic changes of the reflected lights based on the displacement of the object to-be-measured are compensated to a phase difference of fixed value by said phase shifter and which detects a magnitude of phase shift at the moment, an origin position storing circuit which stores a magnitude of phase shift for compensating a phase difference of the reflected lights exhibited when the object to-be-measured lies at a position of an origin, a counter circuit which counts a discontinuous change of the magnitude of phase shift arising each time the phase difference of the reflected lights exceeds a fixed value, and an output circuit which synthesizes the content of said origin position storing circuit, a content of said counter circuit, and an output of said sampling circuit expressive of a magnitude of phase shift for compensating a phase difference exhibited when the object to-be-measured lies at a final position.

7. An apparatus for optically measuring a displacement as defined in claim 6, wherein said phase shifter is an electrooptic crystal which has its refractive index changed when the drive signal is applied thereto.

8. An apparatus for optically measuring a displacement as defined in claim 6, wherein said sampling circuit comprises a differentiation circuit, a comparator, edge detection means to detect a rising edge of an output of said comparator, a gate circuit which is controlled by the drive signal of said phase shifter, an AND circuit which takes a logical product between the output of said edge detection means and an output of said gate circuit, and a sample-and-hold circuit.

9. An apparatus for optically measuring a displacement as defined in claim 6, wherein said counter circuit comprises an up/down pulse generator circuit which includes a plurality of comparators having a reference voltage within a range of an output voltage of said sampling circuit, a plurality of edge detection means to detect rising or falling edges of outputs of said comparators, and AND circuits for taking logical products of outputs of said edge detection means; and an up/down counter which counts output pulses of said AND circuits.

10. In an apparatus wherein light beams are projected on a reference plane and an object to-be-measured, and a displacement of the object to-be-measured is measured by utilizing interference of reflected lights from the reference plane and the object to-be-measured; an apparatus for measuring a displacement comprising a phase shifter which cyclically and forcibly changes a phase difference of the reflected lights with an amplitude of at least $\pi$ rad, means to afford different phases to the reflected lights from the reference plane and the object to-be-measured having passed through said phase shifter, a sampling circuit which samples a magnitude of a drive signal applied to said phase shifter at the moment that phasic changes of the respective reflected lights based on the displacement of the object to-be-measured has been compensated by said phase shifter to estaglish a phase difference of $n\pi + \frac{1}{2}\pi$ between the respective reflected lights and which detects a magnitude of phase shift at the moment, an origin position storing circuit which stores a magnitude of phase shift for compensating a phase difference of the reflected lights exhibited when the object to-be-measured lies at a position of an origin, a counter circuit which counts a discontinuous change of the magnitude of phase shift arising each time the phase difference of the reflected lights exceeds a fixed value, and an output circuit which synthesizes the content of said origin position storing circuit, a content of said counter circuit, and an output of said sampling circuit expressive of a magnitude of phase shift for compensating a phase difference exhibited when the object to-be-measured lies at a final position.

11. An apparatus for optically measuring a displacement as defined in claim 10, wherein said phase shifter is an electrooptic crystal which has its refractive index changed when the drive signal is applied thereto.

12. An apparatus for optically measuring a displacement as defined in claim 10, wherein said sampling circuit comprises a differential amplifier which takes a difference of signals of the two different phases, a comparator, edge detection means to detect both a rising edge and a falling edge of an output of said comparator, a gate circuit which is controlled by the drive signal of said phase shifter, an AND circuit which takes a logical product between an output of said edge detection means and an output of said gate circuit, and a sample-and-hold circuit.

13. An apparatus for optically measuring a displacement as defined in claim 10, wherein said counter circuit comprises an up/down pulse generator circuit which includes a plurality of comparators having a reference voltage within a range of an output voltage of said sampling circuit, a plurality of edge detection means to detect rising or falling edges of outputs of said comparators, and AND circuits for taking logical products of outputs of said edge detection means; and an up/down counter which counts output pulses of said AND circuit.

14. In an apparatus wherein light beams are projected on a reference plane and an object to-be-measured, and a displacement of the object to-be-measured is measured by utilizing interference of reflected lights from the reference plane and the object to-be-measured; an apparatus for optically measuring a displacement comprising an actuator which cyclically and forcibly changes a phase difference of reflected lights with an amplitude of at least $\pi$ rad and which is mounted on the reference plane, a sampling circuit which samples a magnitude of a drive signal applied to said actuator at the moment that phasic changes of the reflected lights based on the displacement of the object to-be-measured is compensated to a phase difference of fixed value by said actuator and which detects a fluctuation magnitude of the displacement at the moment, an origin position storing circuit which stores a magnitude of fluctuation for compensating a phase difference of the reflected lights exhibited when the object to-be-measured lies at a position of an origin, a counter circuit which counts a discontinuous change of the magnitude of fluctuation arising each time the phase difference of the reflected lights exceeds a fixed value, and an output circuit which synthesizes the content of said origin position storing circuit, a content of said counter circuit, and an output of said sampling circuit expressive of a magnitude of fluctuation for compensating a phase difference exhibited when the object to-be-measured lies at a final position.

15. An apparatus for optically measuring a displacement as defined in claim 14, wherein said actuator is an electrostrictive element which generates a displacement proportional to a voltage applied thereto.

16. An apparatus for optically measuring a displacement as defined in claim 14, wherein said sampling circuit comprises a differentiation circuit, a comparator, edge detection means to detect a falling edge of an output of said comparator, a gate circuit which is controlled by the drive signal of said actuator, an AND circuit which takes a logical product between an output of said edge detection means and an output of said gate circuit, and a sample-and-hold circuit.

17. An apparatus for optically measuring a displacement as defined in claim 14, wherein said counter circuit comprises an up/down pulse generator circuit which includes a plurality of comparators having a reference voltage within a range of an output voltage of said sampling circuit, a plurality of edge detection means to detect rising or falling edges of outputs of said comparators, and AND circuits for taking logical products of outputs of said edge detection means; and an up/down counter which counts output pulses of said AND circuit.

18. In an apparatus wherein light beams are projected on a reference plane and an object to-be-measured, and a displacement of the object to-be-measured is measured by utilizing interference of reflected lights from the reference plane and the object to-be-measured; an apparatus for optically measuring a displacement comprising a phase shifter which is arranged immediately behind a light source and which cyclically and forcibly changes a phase difference of the reflected lights with an amplitude of at least $\pi$ rad, means to split light from the light source into a plurality of optical paths via said phase shifter, the reference plane and the object to-be-measured being arranged in each of said plurality of optical paths, sampling circuits each of which samples a magnitude of a drive signal applied to said phase shifter at the moment that phasic changes of the reflected lights based on the displacement of the object to-be-measured in the corresponding optical path is compensated to a phase difference of fixed value by said phase shifter and which detects a magnitude of phase shift at the moment, origin position storing circuits each of which stores a magnitude of phase shift for compensating a phase difference of the reflected lights exhibited when the object to-be-measured in the corresponding optical path lies at a position of an origin, counter circuits each of which is arranged in the corresponding optical path and each of which counts a discontinuous change of the magnitude of phase shift arising each time the phase difference of the reflected lights exceeds a fixed value, and output circuits each of which is arranged in the corresponding optical path and each of which synthesizes the content of said origin position storing circuit, a content of said counter circuit, and an output of said sampling circuit expressive of a magnitude of phase shift for compensating a phase difference exhibited when the object to-be-measured lies at a final position.

19. An apparatus for optically measuring a displacement as defined in claim 18, wherein said phase shifter is an electrooptic crystal which has its refractive index changed when the drive signal is applied thereto.

20. An apparatus for optically measuring a displacement as defined in claim 18, wherein said sampling circuit comprises a differentiation circuit, a comparator, edge detection means to detect a falling edge of an output of said comparator, a gate circuit which is controlled by the drive signal of said phase shifter, an AND circuit which takes a logical product between an output of said edge detection means and an output of said gate circuit, and a sample-and-hold circuit.

21. An apparatus for optically measuring a displacement as defined in claim 18, wherein said counter circuit comprises an up/down pulse generator circuit which includes a plurality of comparators having a reference voltage within a range of an output voltage of said sampling circuit, a plurality of edge detection means to detect rising or falling edges of outputs of said comparators, and AND circuits for taking logical products of outputs of said edge detection means; and an up/down counter which counts output pulses of said AND circuits.

* * * * *